Dec. 15, 1959    R. L. LICH    2,917,006
RAILWAY TRUCK
Filed April 1, 1954    2 Sheets-Sheet 1

INVENTOR.
Richard L. Lich
BY
Rodney Bedell
atty.

Dec. 15, 1959  R. L. LICH  2,917,006
RAILWAY TRUCK
Filed April 1, 1954  2 Sheets-Sheet 2
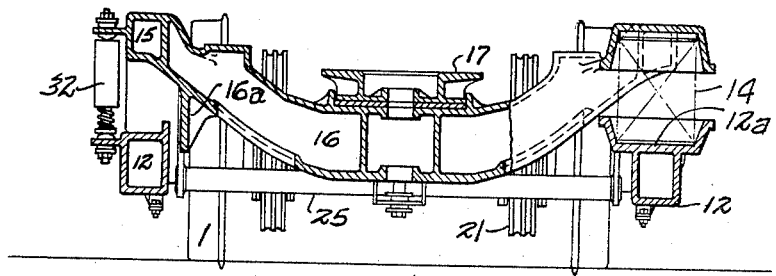
FIG. 3
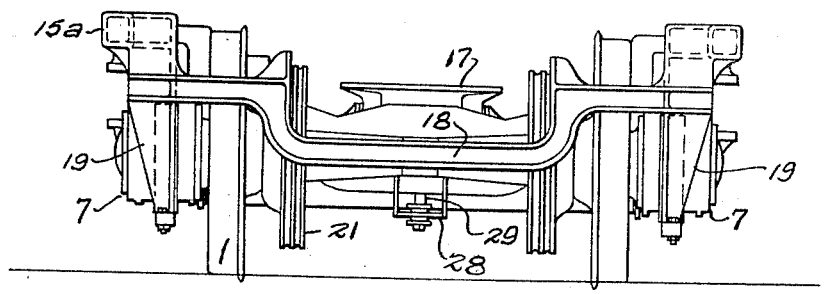
FIG. 4
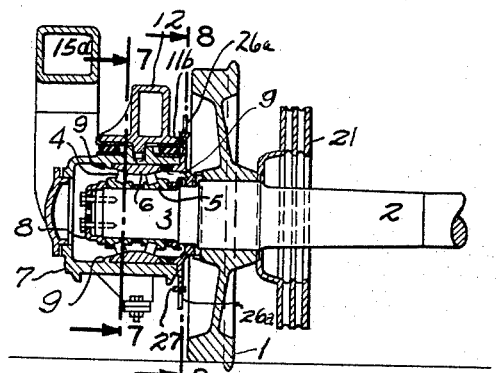
FIG. 5
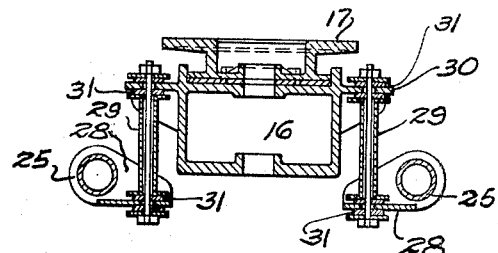
FIG. 6
FIG. 7
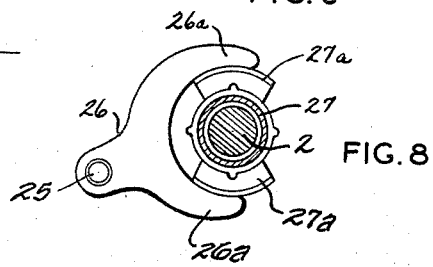
FIG. 8
INVENTOR.
Richard L. Lich
BY Rodney Bedell
atty.

United States Patent Office 2,917,006
Patented Dec. 15, 1959

2,917,006

RAILWAY TRUCK

Richard L. Lich, St. Louis, Mo., assignor to General Steel Castings Corporation, Granite City, Ill., a corporation of Delaware Application April 1, 1954, Serial No. 420,262

3 Claims. (Cl. 105—182)

The invention relates to railway rolling stock and more particularly to vehicle trucks adapted to carry vehicle bodies in passenger train equipment.

The main object of the present invention is to provide a simple, economical truck with minimum of parts but having these parts arranged to accommodate necessary relative movement of running gear and load-supporting parts laterally of the truck and angularly of each other to meet operating conditions and thereby provide easy riding qualities by absorbing transverse shocks between rails and running gear occurring at the high speeds at which passenger trains are operated.

A more detailed object of the invention is to hold the running gear, that is, wheels, axles, journal boxes and the equalizers and brake gear, against undue movement relative to each other transversely of the truck, while accommodating controlled movement of the rigid truck frame and the superstructure support carried thereby, laterally of the truck relative to the running gear through the lateral yielding of truck frame supporting springs. This enables the truck to travel from tangent track to curved track with a minimum of lateral pounding between parts subject respectively to the oposing forces of rail restraint and centrifugal action. This result is to be obtained without requiring a bolster separate from the frame and mounted thereon by rollers, swing hangers or the like.

In the accompanying drawings illustrating a selected embodiment of the invention, Figure 1 is a top view of a four wheel truck with equalizers and a single set of springs supporting the truck frame from the equalizers and arranged to directly support the vehicle body. A portion of the structure is sectioned horizontally on line 1—1 of Figure 2.

Figure 3 is a vertical transverse section taken on the line 3—3 of Figure 1.

Figure 4 is an end view of the truck.

Figure 5 is a vertical transverse section taken on the line 5—5 of Figure 1.

Figure 6 is a vertical longitudinal section taken on the line 6—6 of Figure 1.

Figure 7 is a detail vertical longitudinal section taken on the line 7—7 of Figure 5 and drawn to a larger scale to more clearly illustrate the construction.

Figure 8 is a detailed vertical longitudinal section taken on the line 8—8 of Figure 5 and drawn to the same scale as Figure 7.

Figure 1:
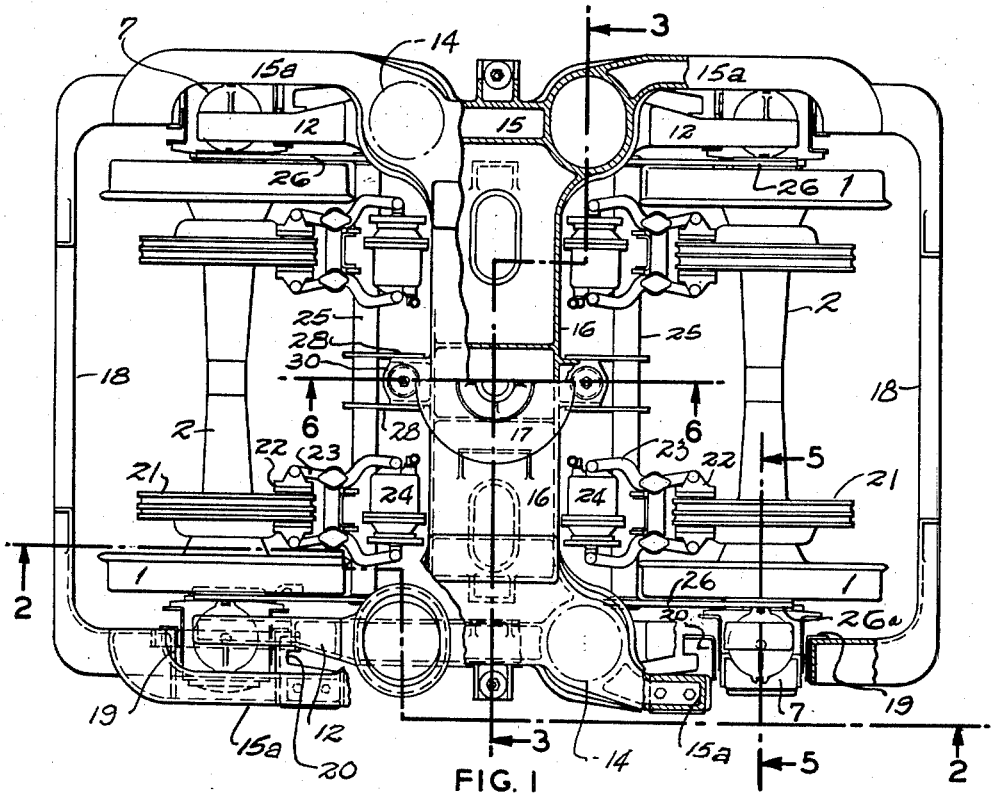
Figure 2:
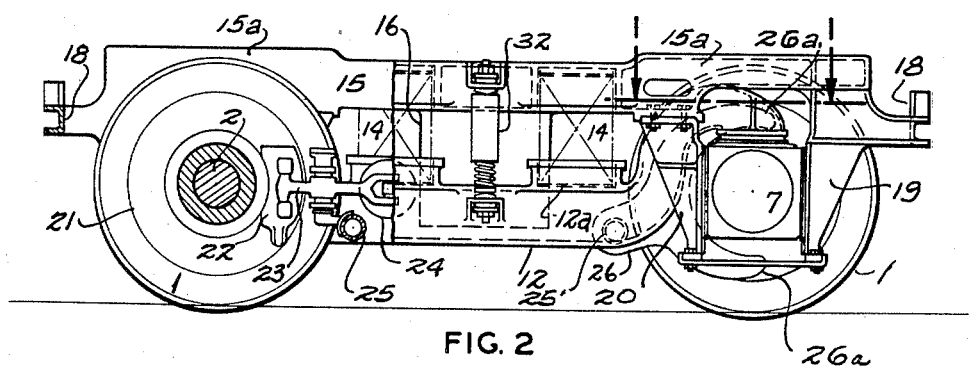
Figure 2 is a side elevation of the structure shown in Figure 1 and partly in section taken on line 2—2 of Figure 1.

The truck includes four wheels 1, mounted on spaced axles 2 having journals 3 fitted with roller bearings 4 with races 5 and 6 mounting the journal boxes 7. Races 5 are secured against movement on journals 3 by suitable caps 8. Races 6 are held against movement by lugs 9 in the walls of the journal box and closure plate 27 (Figure 5).

The inclined surfaces of races 5 and 6, together with the rollers, cooperate with the mounting of the races to hold the boxes and axles against relative movement transversely of the truck.

Each box has a circular upstanding rib 10 with a horizontally circular central recess 10a. Surrounding rib 10 is a pad 11 of rubber-like material. Drop equalizers 12 have their upper end portions seated on pads 11 and are provided with depending circular lugs 13 seated in recesses 10a within ribs 10. Preferably each pad 11 is secured to the associated journal box 7 and equalizer 12 by plates 11a bonded to the opposite faces of the pad and having ribs 11b turned upwardly and downwardly respectively to engage elements of the equalizer and box to prevent bodily rotation of the pad, although the upper and lower surfaces of the pad may rotate relative to each other due to the yielding of the pad in shear to twisting forces.

Each equalizer 12 is of box-like cross section and is provided with spaced seats 12a for coil springs 14 which carry a truck frame comprising spaced wheel pieces 15 and an integral transverse bolster 16 having a load-supporting central bearing 17. Preferably wheel pieces 15 and bolster 16 are of box cross section with the adjacent walls of the members merging to provide a rigid spring-receiving and load-carrying structure. Preferably the ends of wheel pieces 15 are connected by end transoms 18. Pedestal legs 19 and 20 depend from wheel pieces 15 and slidably receive journal boxes 7 between them and clear the boxes sufficiently to permit unsquaring of the wheel-axle-journal box units and the frame and equalizers. Preferably pedestal legs 19 are integral with wheel pieces 15 while pedestal legs 20 are detachably secured to the wheel pieces and may be applied after the truck frame has been lowered onto the journal boxes.

The middle portions of the frame wheel pieces are directly over the equalizers and are provided with caps for springs 14, but adjacent each journal box the wheel piece is offset outwardly of the truck at 15a to clear the high-level end portions of the equalizer. Correspondingly each pedestal leg extends downwardly and inwardly of the truck from an offset portion 15a of the wheel piece to align the box engaging portion of the pedestal leg with the central portion of the box.

The truck frame may move laterally of the wheels, axles, journal boxes and equalizers by the lateral deflection of coil springs 14. Such relative lateral movement is limited by brackets 16a on the bolster which oppose, but are normally spaced from, the inner sides of equalizers 12. The pivotal assembly of the journal boxes and equalizers accommodates unsquaring of the axles relative to the equalizers subject to the resistance provided by distortion in shear of pads 11 supporting the equalizers and the truck load. Lateral deflection of one coil spring on one side of the truck in one transverse direction and lateral deflection of the other spring on that side of the truck in the opposite transverse direction will accommodate unsquaring of the equalizers relative to the axles.

The wheel and axle assemblies are provided with brake discs 21; and brake shoes 22, brake levers 23, air brake cylinders 24 are mounted upon transverse frames 25, each having arms 26 at its ends extending longitudinally of the truck and terminating in opposed jaws 26a receiving between them segments 27a extending upwardly and downwardly of closure plate 27 on the journal box. Transverse frames 25 have brackets 28 at the longitudinal center of the truck connected by anchors 29 to brackets 30 on the truck frame bolster 16. The anchors are of familiar construction and include pads or washers 31 of rubber-like material permitting the anchors to incline from their normal vertical position, shown in Figure 6, to accommodate relative movement of the frame bolster 16 and the brake frames 25 due to the lateral distortion of frame supporting springs 14.

With this construction the entire brake mechanism moves with the wheels, axles and equalizers and there is no necessity for the relatively complicated pivoted brake hanger arrangement which would be required by brakes applied to the wheel treads and supported from truck frames.

The structure described also possesses the following advantages over the usual type of four wheel passenger truck with a frame and a separate bolster supported by swing hangers.

A single spring system supports the rigid truck frame and its load so that the load may move laterally and vertically of the running gear. Snubbers 32 prevent undue vertical oscillations of springs 14.

The wheel pieces are relatively light since the pedestal legs carry brake retardation forces only.

No lateral forces are carried by the wheel pieces outwardly of the spring pockets towards ends of the trucks as these forces are carried by the box section equalizers.

Lateral shocks are absorbed close to the source of shock, thus requiring the acceleration of a minimum amount of mass. The lateral shocks would be absorbed before reaching the truck frame, thus avoiding acceleration of the truck frame mass as in the ordinary truck with truck frame pedestals to take the shocks.

Since swing hangers are not used, numerous pins, bushings, etc., are eliminated.

The frame, including the load-carrying central bearing, is a simple one piece rigid casting and the wheel base is much shorter than the wheel base of trucks which include swing hanger supports for the truck frame.

The details of the construction may be varied substantially without departing from the spirit of the invention and the exclusive use of those modifications coming within the scope of the claims is contemplated.

What is claimed is:

1. A railway truck comprising a pair of axles having spaced wheels thereon, a pair of journal boxes receiving opposite end portions of each axle, the upper surface of each journal box having an upstanding circular rib thereon provided with a centrally disposed recess, a pair of equalizers extending between said axles adjacent the ends thereof, each equalizer having downwardly facing terminals each provided with a depending lug, each such lug being received in the recess of a corresponding journal box, an annular pad of rubber-like material surrounding each of said upstanding ribs on the journal boxes in compressed, sandwiched condition between the journal box and the associated terminal of the equalizer, a truck frame including a transverse bolster extending parallel to said axles and within a vertical plane intermediate vertical planes containing said axles, a pair of wheel pieces rigid with each end of said bolster and extending generally at right angles therefrom in opposite, generally horizontal directions to extend above corresponding ends of said axles, a pair of pedestal legs depending from each wheel piece in straddling relation to an associated journal box, each such pair of pedestal legs being spaced apart a distance greater than the dimension of the journal box portion which they straddle to permit limited fore and aft shifting of the axle ends whereby the axles may be unsquared to conform with track conditions, said portions of the journal boxes which are straddled by said pair of pedestal legs and material portions of the journal boxes on either side thereof being throughout of uniformly lesser dimensions than the spacing between each pair of pedestal legs to permit lateral shifting of said axles relative to each pair of pedestal legs and the truck frame, spring means interposed between said equalizers and said truck frame to resiliently support the truck frame upon the equalizers and axle assemblies, and a depending bracket rigid with each end of said bolster spaced inwardly of and opposed to a corresponding equalizer to limit lateral shifting of the truck frame relative to said axles.

2. A railway truck comprising a pair of axles having spaced wheels thereon, a pair of journal boxes receiving opposite end portions of each axle, the upper surface of each journal box having an upstanding circular rib thereon provided with a centrally disposed recess, a pair of equalizers extending between said axles adjacent the ends thereof, each equalizer having downwardly facing terminals each provided with a depending lug, each such lug being received in the recess of a corresponding journal box, an annular pad of rubber-like material surrounding each of said upstanding ribs on the journal boxes in compressed, sandwiched condition between the journal box and the associated terminal of the equalizer, a truck frame including a transverse bolster extending parallel to said axles and within a vertical plane intermediate the vertical planes containing said axles, said bolster having its opposite ends positioned in spaced relation above said equalizers, a pair of wheel pieces rigid with each end of said bolster and extending generally at right angles therefrom in opposite, generally horizontal directions to extend above corresponding ends of said axles, said wheelpieces being positioned outwardly of the terminals of said equalizers and each wheel piece having a pair of depending pedestal legs disposed in straddling relation to an associated journal box, one of said pedestal legs of each pair being integrally formed with its corresponding wheel piece and the other pedestal leg of each pair being removably affixed thereto, each pair of pedestal legs being spaced apart a distance greater than the dimension of the journal box portion which they straddle to permit limited fore and aft shifting of the axle ends so that the axles may be unsquared with relation to the truck frame, said portions of the journal boxes which are straddled by said pair of pedestal legs and material portions of the journal boxes on either side thereof being throughout of uniformly lesser dimensions than the spacing between each pair of pedestal legs to permit lateral shifting of said axles relative to each pair of pedestal legs and the truck frame, spring means interposed between said equalizers and said truck frame to resiliently support the truck frame upon the equalizers, and a depending bracket rigid with each end of said bolster spaced inwardly of and opposed to a corresponding equalizer to limit lateral shifting of the truck frame relative to said axles.

3. The assembly as defined in and by claim 1 wherein said axles are provided with brake discs spaced inwardly from the wheels on the axles, and brake means mounted from said journal boxes on each axle for engaging said brake discs.

References Cited in the file of this patent

UNITED STATES PATENTS

| | | |
|---|---|---|
| 1,776,174 | Wallace | Sept. 16, 1930 |
| 1,823,844 | Brittain | Sept. 22, 1931 |
| 1,941,996 | Mussey | Jan. 2, 1934 |
| 1,994,304 | Devlin | Mar. 12, 1935 |
| 2,100,065 | Buckwalter | Nov. 23, 1937 |
| 2,229,429 | Travilla | Jan. 21, 1941 |
| 2,230,259 | Mussey | Feb. 4, 1941 |
| 2,347,362 | Nystrom et al. | Apr. 25, 1944 |
| 2,374,218 | Ledwinka | Apr. 24, 1945 |
| 2,384,459 | Eksergian | Sept. 11, 1945 |
| 2,425,282 | Ledwinka | Aug. 5, 1947 |
| 2,533,639 | Travilla | Dec. 12, 1950 |
| 2,632,406 | Nystrom et al. | Mar. 24, 1953 |
| 2,713,832 | Dean et al. | July 26, 1955 |
| 2,782,732 | Rossell | Feb. 26, 1957 |